Dec. 1, 1959  A. L. LEE ET AL  2,915,146
WEAR COMPENSATING MEANS
Filed Dec. 31, 1957  3 Sheets-Sheet 1
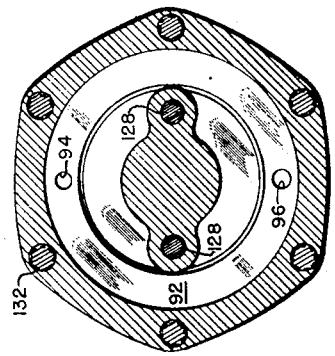
FIG.2
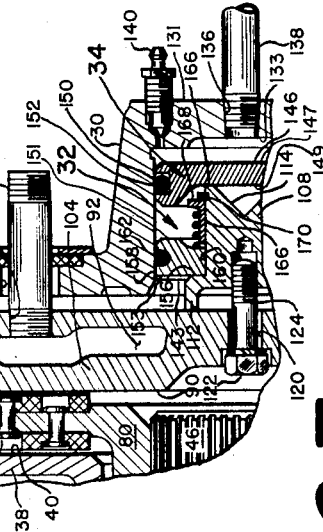
FIG.7
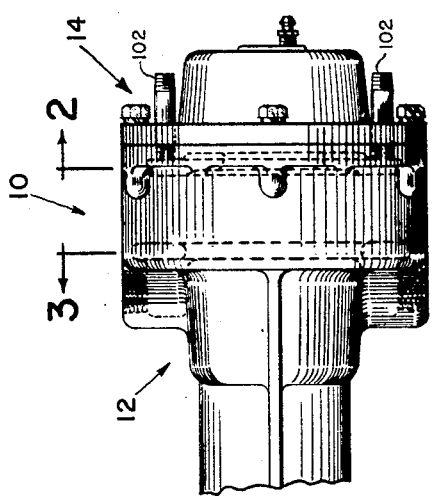
FIG.1
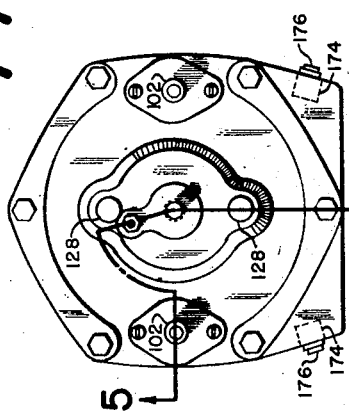
FIG.4
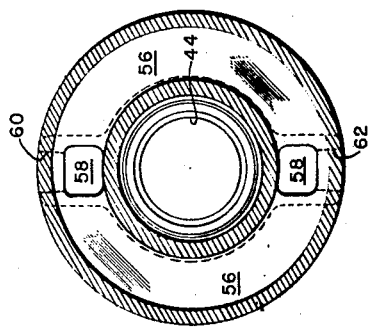
FIG.3
INVENTORS.
ARTHUR L. LEE
ARTHUR B. COVAL
BY
Stanley J. Price
THEIR ATTORNEY

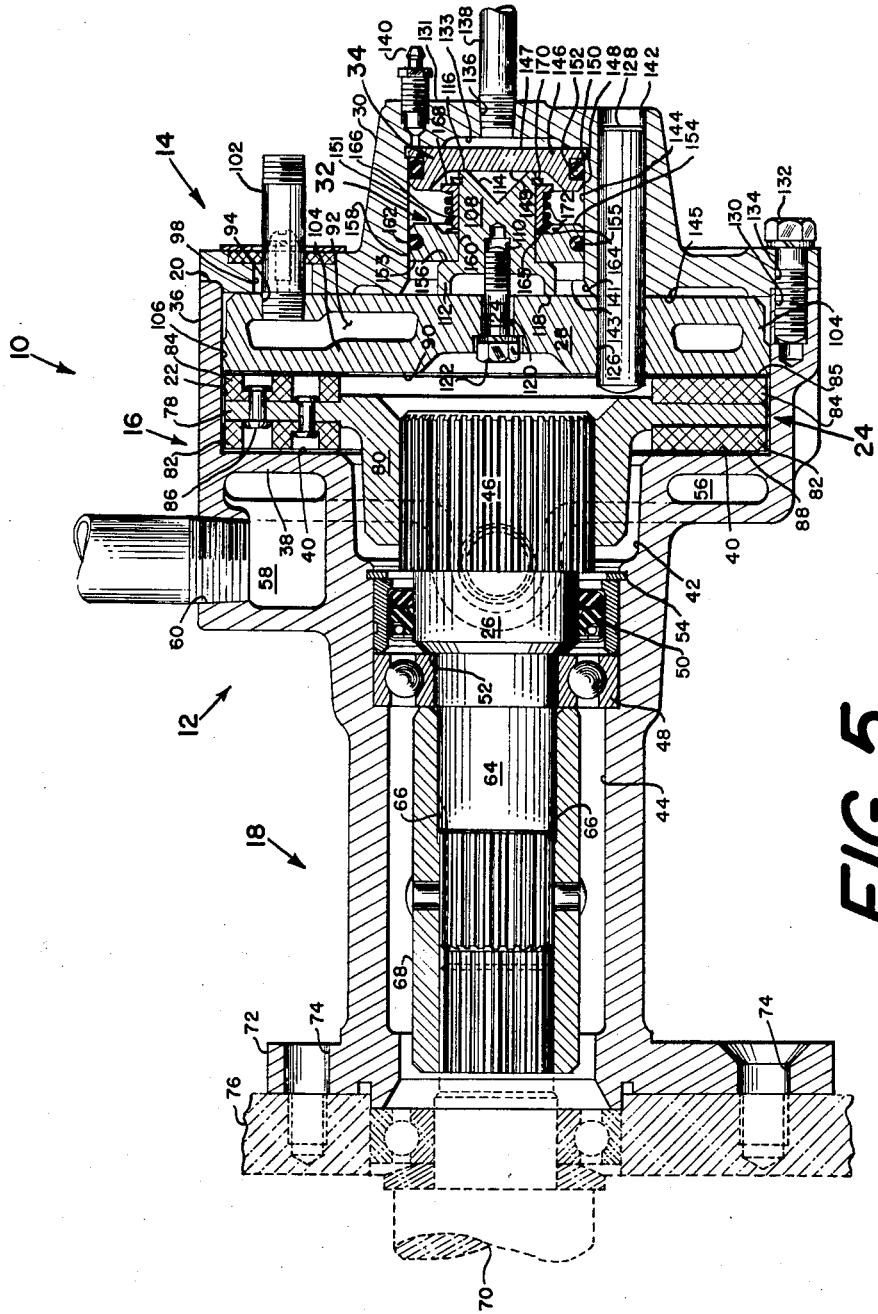

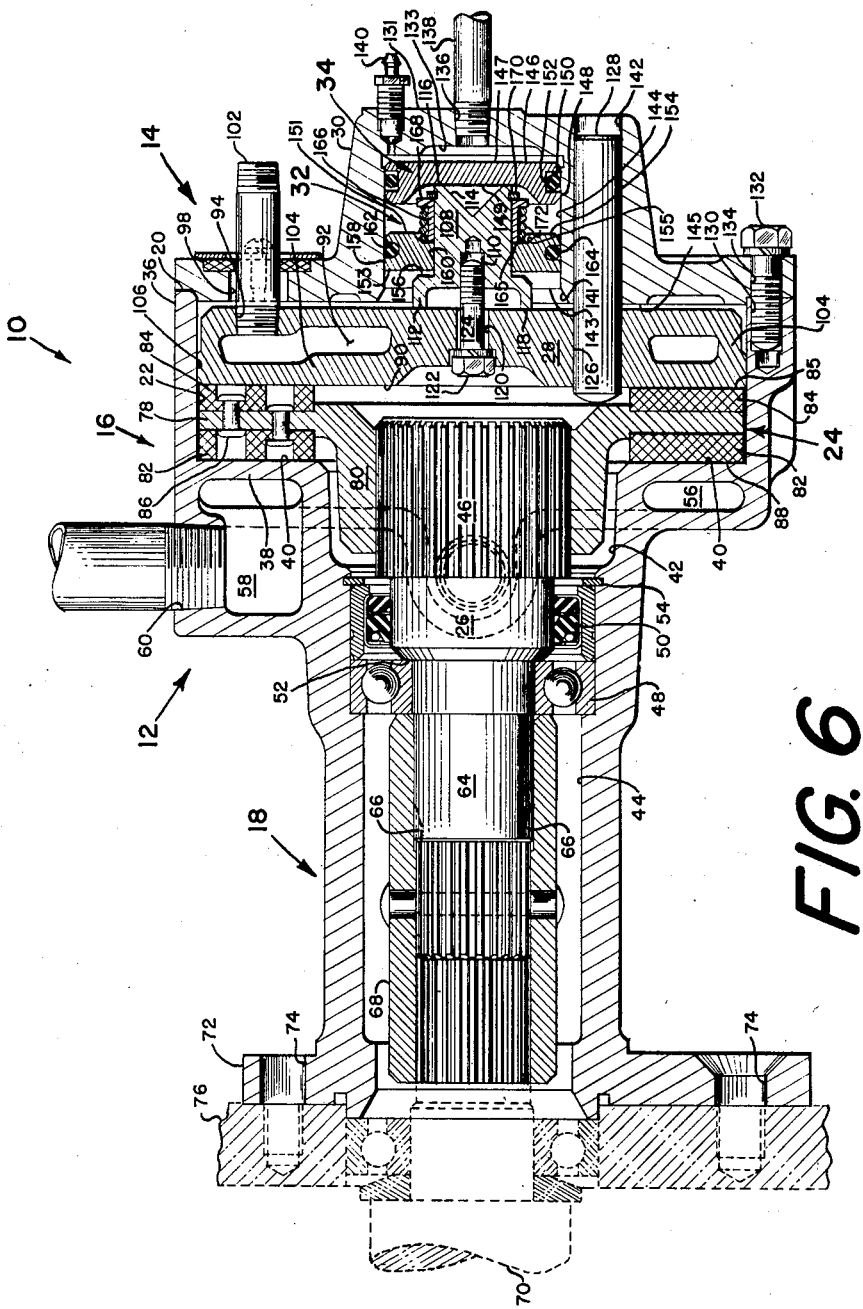

United States Patent Office 2,915,146
Patented Dec. 1, 1959

2,915,146

WEAR COMPENSATING MEANS

Arthur L. Lee and Arthur B. Coval, Columbus, Ohio, assignors to Consolidation Coal Company, Pittsburgh, Pa., a corporation of Pennsylvania Application December 31, 1957, Serial No. 706,482

3 Claims. (Cl. 188—72)

This invention relates to a wear compensating means and more particularly to a wear compensating means adapted to be employed with a pressure operated actuating means.

Where fluid pressure operated means are employed to exert forces on other actuating means to perform a given function, the reciprocal stroke of the piston increases in proportion to the wear of the friction members. This increase in the reciprocal stroke of the piston requires greater liquid displacement in the cylinder. For example, in a pressure operated brake where the friction members are relatively new and not worn the liquid displacement required to actuate the brake is relatively small and the time lag between brake application and actual brake actuation is, therefore, relatively short. Where the friction members are worn and a greater liquid displacement is required for brake actuation the time lag between brake application and brake actuation is considerably greater. This difference in time between brake application and brake actuation is undesirable and at times extremely hazardous. This is particularly true in high speed vehicles where instantaneous brake actuation is almost a necessity for safe operation.

With our invention the liquid displacement required for brake actuation remains the same irrespective of the worn condition of the friction members. With our invention the time lag between brake application and brake actuation remains constant.

Accordingly, the principal object of this invention is to provide a wear compensating means operable to maintain the same liquid displacement in the cylinder irrespective of friction member wear.

Another object of our invention is to provide a wear compensating means that also serves as a portion of the actuating means.

Another object is to provide a wear compensating means that is simple in construction, built at minimum cost with a minimum number of moving parts.

These and other objects will be more completely disclosed and described in the following specification, the accompanying drawings and the appended claims.

In the accompanying drawings there is clearly and fully illustrated one embodiment of this invention, in which drawings:

Figure 1 is a view of the brake assembly in side elevation.

Figure 2 is a view in section taken along the lines 2—2 of Figure 1.

Figure 3 is a view in section taken along the lines 3—3 of Figure 1.

Figure 4 is a view of the brake assembly in end elevation.

Figure 5 is a developed section taken along the line 5—5 of Figure 4 and illustrating the brake in its disengaged position.

Figure 6 is a view similar to Figure 5 and illustrates the brake in the engaged position.

Figure 7 is an enlarged fragmentary view of the wear compensating means and disc brake illustrating the friction members in a worn condition.

Referring to the drawings and particularly to Figures 1, 5 and 6, there is illustrated our brake assembly generally designated by the numeral 10. The brake assembly 10 has two major external portions, the housing 12 and the end plate 14. The housing 12 is cylindrical in shape and has a body portion 16 and a cylindrical sleeve portion 18 extending rearwardly therefrom. The housing body portion 16 has an open end 20 which is closed by the end plate 14 to form a totally enclosed brake assembly that is packaged against dust and dirt.

The housing body portion 16 has an internal cavity 22 (Figures 5 and 6) in which there is positioned an annular disc brake 24. The disc brake 24 is arranged coaxially on a shaft 26 that has one end in the housing body portion cavity 22 and the other end extending into the housing sleeve 18. Also positioned in the housing cavity 22 is a pressure plate 28 which is arranged to move axially within the cavity 22 to frictionally engage the disc brake 24.

The end plate 14 has a cup shaped central portion 30 which forms an internal chamber or cavity 32. The chamber 32 is adapted to serve as a cylinder associated with the actuating means as will be later explained. The brake actuating means generally designated by the numeral 34 is positioned within the chamber 32 and is operable to move the pressure plate 28 axially in the cavity 22 to frictionally engage the disc brake 24.

The detailed construction of the various parts of the brake assembly 10 is illustrated in detail in Figures 5 and 6. The housing cylindrical body portion 16 has a cylindrical wall 36 that terminates in the housing open end 20. The housing cavity 22 has an annular inwardly extending wall 38 which is integrally formed with the cylindrical wall 36. The annular wall 38 has an outer annular surface 40 that is adapted to serve as a metal friction surface for the brake mechanism. The housing annular wall 38 has an enlarged central passageway 42 which is coaxial with and forms a part of a longitudinal passageway 44 in the housing sleeve portion 18. The shaft 26 extends through the sleeve passageway 44 and has an externally splined end portion 46 extending into the enlarged passageway 42 of the housing body portion 16. Roller bearings 48 are carried in the sleeve passageway 44 and rotatably support the shaft 26. Annular sealing means 50 extend around the shaft 26 adjacent the bearings 48 and serve as a closure means between the sleeve passageway 44 and the housing passageway 42. The shaft 26 has a shoulder portion 52 that abuts the bearings 48. This shoulder portion 52 limits axial movement of the shaft 26 in the sleeve passageway 44. An annular snap ring 54 maintains the bearings 48 and sealing means 50 in a fixed position in the sleeve passageway 44.

The housing body portion 16 has an annular passageway 56 formed therein. The annular passageway 56 is shown in section in Figure 3 and has a pair of rearwardly offset chambers 58. The chambers 58 have radial openings 60 and 62 which are arranged to receive inlet and outlet conduits that convey cooling liquid through the annular passageway 56. It should be noted that the housing annular wall 38 is also a wall of the passageway 56. The annular wall 38, as previously stated, has an outer surface 40 that serves as a friction surface for the brake mechanism. The fluid in the passageway 56 is in direct heat exchange relation with one side of the wall 38 and the other side of the wall 38 is in direct heat exchange relation with the disc brake 24. Thus the wall 38 is arranged to be in frictional engagement with the disc brake 24 on one side and in heat exchange relation with the cooling liquid on the other side.

The shaft 26 has an enlarged externally splined end portion 46 positioned within the housing passageway 42. The other end portion 64 extends into the sleeve passageway 44 and has a pair of key slots 66 that are illustrated in dotted lines in Figures 5 and 6. An internally splined sleeve 68 is keyed at one end to the shaft 26 and is arranged to couple the shaft 26 to a driven shaft 70 indicated in dotted lines. The housing sleeve 18 has a radially flanged end portion 72. Apertures 74 extend through the flange 72 and are arranged to secure the brake housing 12 to a fixed portion of the vehicle as indicated in dotted line at 76. Thus the housing 12 is rigidly secured to the vehicle and the shaft 26 is secured to and rotatable with the driven shaft 70. The disc brake 24 is thus arranged to control the rotation of shaft 70 and in turn regulate vehicle movement.

The disc brake 24 has an annular plate 78 with a rearwardly offset internally splined hub portion 80. The hub portion 80 is splined on the externally splined end portion 46 of shaft 26. The plate hub 80 is so arranged on the splined end portion 46 that it is axially movable thereon but nonrotatable relative thereto. This arrangement permits the pressure plate 28 to move the disc brake 24 against the housing wall 38 upon brake actuation. When the brake is disengaged this arrangement permits the disc brake 24 to move away from the housing annular wall 38 by centrifugal force so that the brake is equidistant between the housing wall 38 and the pressure plate 28. In this position the disc brake 24 revolves freely between the housing annular wall 38 and the pressure plate 28 with an air lubricant therebetween.

A pair of annular friction members 82 and 84 are secured to opposite sides of the disc brake 78 by means of rivets 86. The friction disc 82 has an outer surface 88 that, upon brake actuation, moves into frictional engagement with the housing annular wall outer surface 40. The annular friction member 84 has an outer surface 85 that upon brake actuation is frictionally engaged by the pressure plate end wall 90.

The pressure plate 28 has an annular passageway 94 therein with a pair of lateral openings 94 and 96. Since Figures 5 and 6 are developed sections, only the lateral opening 94 is illustrated. The lateral openings 94 and 96 are arranged in axial alignment with apertures 98 and 100 in end plate 14. Nipples 102 are secured in the apertures 94 and 96 and extend through respective apertures 98 and 100 and are arranged to convey cooling liquid therethrough. It should be noted that a side wall 104 of passageway 92 is in heat exchange relation with both the liquid in passageway 92 and with the friction disc 84. The pressure plate 28 has an outer circumferential wall 106 that abuts the inner surface of the housing inner cylindrical wall 36.

The pressure plate 28 has a cylindrical hub portion 108 that has a central threaded passageway 110 therein. The hub 108 has an annular flanged portion 112 extending outwardly from one end. The other end of the hub portion 108 has an internal conical cavity 114 which forms an annular edge portion 116. The hub annular flanged portion 112 terminates in an annular edge portion 118. The pressure plate 28 has a central aperture 120 and a bolt 122 extends therethrough. The diameter of the aperture 120 is greater than the diameter of the bolt body portion 124 so that when properly positioned the bolt body portion 124 is in spaced relation with the cylindrical wall of aperture 120. The bolt 122 is arranged to threadedly secure the hub 108 to the pressure plate 28 with the annular edge 118 of hub 108 abutting the rear wall of pressure plate 28. The pressure plate 28 also has a plurality of dowel apertures 126 therethrough which receive dowel pins 128 as later explained.

The housing cylindrical wall 36 has a plurality of longitudinal threaded apertures 130 and the end plate 14 has a plurality of mating circumferential apertures 134 which are axially aligned with the apertures 130 in the brake housing cylindrical wall 36. The end plate 14 is detachably secured to the brake housing 12 by means of bolts 132 extending through aligned apertures 130 and 134.

The end plate hub portion 30 has a central aperture 136 extending longitudinally therethrough. The aperture 136 receives a conduit 138 that is arranged to supply pressurized fluid to the hub portion chamber 32. A lubricating fitting 140 is also provided to supply lubricant to the inner chamber 32. The hub portion 30 also has a plurality of dowel passageways 142 extending longitudinally therethrough in axial alignment with the respective dowel apertures 126 in pressure plate 28. The passageways 142 and apertures 126 receive dowel members 128 that maintain the pressure plate 28 in nonrotatable relation relative to the end plate 14 and the brake housing 12. The pressure plate 28, however, is movable axially relative to the end plate 14.

The end plate hub 30 has an inner cylindrical surface 144 that serves as the cylindrical wall or cylinder for the pressure actuating means 34. The cup shaped hub portion 30 has a vertical end wall 131 with an inner surface 133 which forms the end wall closure surface for the cylinder of the actuating means 34. Positioned within the hub chamber 32 is the pressure actuating means 34 which includes a dish shaped piston 146. The piston 146 has a circumferential wall 148 that abuts the cylindrical surface 144 and a rear wall 147 which is adjacent the hub vertical wall 131 and a front wall 149. The actuator hub annular portion 116 abuts the piston front wall 149. The piston 146 is movable axially within the hub chamber 32 with its circumferential wall 148 abutting the cylindrical wall 144. The piston circumferential wall 148 has an annular recess 150 that receives an O-ring 152 therein. The O-ring 152 limits passage of the pressurized fluid around the piston 146 and serves as a seal. With this construction, pressurized fluid entering the chamber 32 through conduit 138 first fills the void between the end plate hub vertical wall inner surface 133 and the rear wall 147 of piston 146. Additional pressurized fluid entering through conduit 138 exerts a force on piston 146 so that the piston 146 moves axially away from the end plate hub vertical wall 131. As the piston 146 moves away from the end plate hub vertical wall 131, axial movement is transmitted from piston 146 to the pressure plate hub 108 so that the pressure plate 28 moves axially into frictional engagement with the disc brake 24.

An annular wear compensator member 154 is positioned on the cylindrical hub 108 adjacent the hub shoulder 156 formed by the hub annular flanged portion 112. The wear compensator member 154 has a rear wall 151, a front wall 153, an outer circumferential wall 158 and an inner circumferential wall 160. The wear compensator rear wall 158 has an inwardly recessed portion 155 adjacent the inner cylindrical wall 160. The wear compensator member outer circumferential wall 158 is in sliding relation with the end plate hub portion inner cylindrical wall 144. The wear compensator member inner cylindrical wall 160 is slidable relative to the cylindrical wall of the pressure plate hub 108. The outer circumferential wall 158 has an annular groove 162 therein. Positioned in this annular groove 162 is an O-ring 164 which is of such dimension that it maintains the wear compensator member 154 in frictional engagement with the end plate hub portion cylindrical wall 144. The O-ring 164 is so constructed that an axial force of between 40 and 60 pounds is required to move the wear compensator member 154 axially relative to the end plate hub cylindrical wall 144. The pressure plate hub 108 is of such dimension that it is freely movable relative to the wear compensator member 154.

The pressure plate 108 has a sleeve member 166 positioned thereon between the piston 146 and the wear compensator 154. The sleeve 166 has a front end portion 165 and an outwardly flanged rear end portion 168. The sleeve front end portion is arranged in spaced relation with the wear compensator rear wall 151 and forms a shoulder on pressure plate hub 108. With this construction, as the pressure plate hub 108 and sleeve 166 move toward the disc brake 24 the sleeve end wall 165 is arranged to abut the wear compensator rear wall 151 to move the compensator member 154 axially forward therewith. The sleeve 166 has an outward radial flange 168 that is limited in rearward axial movement by the snap ring 170 that is imbedded in a groove in pressure plate hub 108. A helical spring 172 is positioned around the sleeve 166 and abuts the sleeve rear flange 168 at one end and the wear compensator member rear wall 151 at the other end. The spring 172 is arranged to be compressed against the wear compensator 154 as pressurized fluid entering through conduit 138 moves piston 146 toward the disc brake 24. The spring 172 is so constructed that its force of compression, when it is compressed through a lineal distance substantially equal to the space between the sleeve front end portion 165 and the wear compensator member rear wall 151, does not exceed the frictional force exerted by the O-ring 164. With this construction the spring 172 does not exert a sufficient force through its compression to move the wear compensator member 154 forwardly. However, when fluid pressure within the cavity 132 is relieved the spring 172 expands against the compensator 154 and moves the piston 146 toward the end plate hub vertical wall 131. The wear compensator member 154 thus serves as a backing means for the spring 172 assuring positive return of piston 146 and proper disengagement of pressure plate 28 as the brake mechanism is released. The housing 12 has a pair of radial apertures 174 (Figure 4) which extend into the cavity 22. Plug members 176 close the apertures 174. The wear of the friction members 82 and 84 may be visually checked by the removal of plugs 176.

To more clearly point out the operation of the wear compensator means, the specific shape of the end plate hub portion 30 will be set forth. The end plate hub portion inner cylindrical wall 144 terminates in an outwardly flared end portion 141. The rear edge of the outer flared portion 141 is indicated by a vertical line 143 in Figures 5, 6 and 7. The front wall of the flared end portion 141, which is the front wall of the end plate 14, is designated by the numeral 145.

Operation

The operation of the wear compensator means is best described in comparing Figures 5 and 7. In Figure 5 the friction members 82 and 84 are illustrated as relatively new and not in a worn condition. This can be noted by the relative distance between the heads of the rivets 86 and the respective friction surfaces 88 and 85 of friction members 82 and 84. Figure 7 illustrates the friction members 82 and 84 in a worn condition. This can be noted by the distance between the friction surfaces 88 and 85 and the heads of the rivets 86. In comparing Figure 5 and Figure 7 the relative distance between the piston rear wall 147 and end plate hub vertical wall front surface 131 should also be noted. Both Figures 5 and 7 illustrate the brake in the disengaged position and under operating conditions the cavity between the piston rear wall 147 and the hub vertical wall front surface 131 is filled with fluid although the fluid is not under pressure.

To actuate the brake mechanism 10 fluid under pressure enters through conduit 138 into the chamber 32. The fluid exerts a pressure on the piston rear wall 147 to move the piston axially forward. The pressure plate hub 108 is in abutting relation with the piston 146 and movement of piston 146 is transmitted through hub 108 to the pressure plate 28. Therefore, the forward movement of pressure plate 28 is directly proportional to the forward movement of piston 146. As previously stated, forward movement of piston 146 compresses the spring 172 between the wear compensator member 154 and the sleeve radial flange 168. Simultaneously with the movement of piston 146 the pressure plate hub flanged portion 156 moves axially away from the wear compensator member 154. The relative dimensions of the brake components are such that in the brake released condition there is approximately .010 inch clearance between the friction surfaces 88 and 85 and the adjacent surfaces of the housing and pressure plate (see Figures 5 and 7). In addition, in the brake released position there is approximately .020 inch clearance between the sleeve front end portion 165 and the wear compensator rear wall 151.

When fluid pressure is applied to the rear wall of piston 146 and the brake is engaged, the pressure plate 28 moves the disc brake 24 so that the friction members 82 and 84 are in frictional engagement with the respective surfaces of the housing 16 and the pressure plate 28 (Figure 6). In the engaged position the sleeve end wall 165 abuts the wear compensator rear wall 151 and there is an .020 inch clearance between the hub shoulder 156 and the wear compensator front wall 153. This relative movement of the pressure plate hub 108 to the wear compensator 154 provides for the compression of spring 172 and assures positive disengagement of the pressure plate 28 from the disc brake 24.

As the friction members 82 and 84 wear and decrease in longitudinal dimension, the sleeve end wall 165 not only abuts the wear compensator rear wall 151 but it also moves the wear compensator 154 axially forward toward the pressure plate 28. As previously stated, the O-rings 164 surrounding the wear compensator 154 exerts a frictional force of approximately 40 to 60 pounds against the cylindrical wall 144. The pressure of the fluid actuating the brake mechanism exceeds this pressure and may be in the vicinity of several hundred pounds. Since this pressure exceeds the frictional pressure and there is a direct connection between the piston 146 and the wear compensator 154 through the sleeve 166, the wear compensator 154 will move forward upon wear of the friction members 82 and 84.

In the worn position as illustrated in Figure 7, movement of piston 146 toward the hub end wall 131 is limited by the pressure plate hub shoulder 156 abutting the wear compensator forward front wall 153. With this construction, although fluid pressure has been released, the portion of chamber 32 between the piston end wall 147 and the end plate hub vertical wall inner surface 133 remains filled with fluid so that upon subsequent brake actuation the same volume of liquid is required to move the pressure plate .020 inch and actuate the brake as was formerly required when the friction members were new.

It should also be noted upon replacement of friction members 82 and 84 the brake compensating means, due to the shoulder 156 on hub 108, automatically repositions itself so that proper clearances are obtained.

Although our wear compensating means has been described in conjunction with a disc brake, it should be understood that we do not intend to be limited to this specific application and it is within the scope of this invention to employ our wear compensating means in structures other than the specific structure illustrated. For example, our wear compensating means may be employed with any fluid pressure actuating means used in conjunction with friction members that are subject to wear. The dimensions and clearances set forth were intended as examples only and this invention should not be limited thereto.

According to the provisions of the patent statutes, we have explained the principle, preferred construction, and mode of operation of our invention and have illustrated and described what we now consider to represent its best embodiment. However, we desire to have it under-

We claim:

1. A disc brake mechanism comprising in combination a housing having a cylindrical body portion with an open end portion, an end plate enclosing said housing open end portion and forming an enclosed cavity within said housing, an annular disc brake coaxially positioned in said housing cavity in rotatable relation thereto, a pressure plate positioned in said housing cavity between said disc brake and said end plate, and movable axially toward said disc brake to thereby restrain rotation thereof, said end plate having a cup shaped central portion forming a cylindrical chamber with a closed end wall, said pressure plate having a hub portion extending into said chamber with an end portion forming a piston, an annular wear compensator member positioned around said hub portion in said chamber, means to restrain movement of said compensator member relative to said chamber, said hub portion having an abutment means thereon between said piston and said pressure plate, spring means positioned between said wear compensator and said piston, means to maintain a fixed dimension between said wear compensator and said piston in the absence of fluid under pressure in said chamber, said spring means arranged to be compressed against said wear compensator during the forward braking stroke of said piston, said spring means arranged to return said piston rearwardly in said chamber to said fixed dimension from said wear compensator, said abutment means arranged to engage and move said wear compensator member forwardly in said chamber a predetermined distance substantially equal to the decrease in dimension of said disc brake due to friction wear and thereby maintain the forward braking stroke of said piston substantially the same irrespective of brake wear.

2. A disc brake mechanism comprising in combination a housing having a cylindrical body portion with an open end portion, an end plate enclosing said housing open end portion and forming an enclosed cavity within said housing, an annular disc brake coaxially positioned in said housing cavity in rotatable relation thereto, a pressure plate positioned in said housing cavity between said disc brake and said end plate, and movable axially toward said disc brake to thereby restrain rotation thereof, said end plate having a cup shaped central portion forming a cylindrical chamber with a closed end wall, said pressure plate having a hub portion extending into said chamber with an end portion forming a piston, an annular wear compensator member positioned around said hub portion in said chamber, means to restrain movement of said compensator member relative to said chamber, said hub portion having a first abutment means thereon between said piston and said wear compensator and a second abutment means between said wear compensator and said pressure plate, spring means positioned between said wear compensator and said piston, said spring means operable to urge said second abutment means against said wear compensator in the absence of fluid under pressure in said chamber, said spring means arranged to be compressed against said wear compensator during the forward braking stroke of said piston and thereby move said hub second abutment means away from said wear compensator, said spring means arranged to move said piston rearwardly in said chamber and urge said second abutment means against said wear compensator, said first abutment means arranged to engage and move said wear compensator member forwardly in said chamber a predetermined distance substantially equal to the decrease in dimension of said disc brake due to friction wear and thereby maintain the forward braking stroke of said piston substantially the same irrespective of wear of said disc brake.

3. A disc brake mechanism comprising in combination a housing having a cylindrical body portion with an open end portion, an end plate enclosing said housing open end portion and forming an enclosed cavity within said housing, said housing having a vertical end wall in spaced relation to said end plate, an annular disc brake coaxially positioned in said housing cavity between said vertical end wall and said end plate, said disc brake being rotatable relative to said housing, a pressure plate positioned in said housing cavity between said disc brake and said end plate and movable axially toward said disc brake to thereby restrain rotation thereof, said end plate having a cup shaped central portion forming a cylindrical chamber with a closed end wall, a pressure plate having a hub portion extending into said chamber with an end portion forming a piston, an annular wear compensator member positioned around said hub portion in said chamber, said wear compensator having an O-ring therearound that frictionally engages said wear compensator to said chamber, a sleeve member positioned on said hub portion between said wear compensator and said piston, said sleeve member having a front end portion and a flanged rear end portion, said hub portion having a snap ring thereon adjacent said piston, said sleeve front end portion forming a first abutment means on said hub portion between said wear compensator and said piston, said hub portion having an outwardly extending shoulder portion between said pressure plate and said wear compensator, said shoulder portion forming a second abutment means on said hub portion, a helical spring positioned around said hub portion between said wear compensator and said sleeve flanged portion, said spring urging said second abutment means against said wear compensator and said sleeve flanged rear end portion against said snap ring in the absence of fluid under pressure in said chamber, said sleeve front end portion being spaced from said wear compensator a distance substantially equal to the distance between the surfaces of said disc brake and the adjacent surfaces of said housing and said pressure plate in the absence of fluid under pressure in said chamber, said spring arranged to be compressed against said wear compensator during the forward braking stroke of said piston and thereby move said hub second abutment means away from said wear compensator, said spring arranged to move said piston rearwardly in said chamber and urge said second abutment means against said wear compensator, said first abutment means arranged to engage and move said wear compensator member forwardly in said chamber a predetermined distance substantially equal to the decrease in dimension of said disc brake due to friction wear and thereby maintain the forward braking stroke of said piston substantially the same irrespective of wear of said disc brake.

References Cited in the file of this patent

UNITED STATES PATENTS

| | | |
|---|---|---|
| 799,690 | Sturtevant | Sept. 19, 1905 |
| 2,089,733 | Criley | Aug. 10, 1937 |
| 2,127,557 | Ells | Aug. 23, 1938 |
| 2,358,740 | Scott-Iversen | Sept. 19, 1944 |
| 2,474,961 | Sneed | July 5, 1949 |
| 2,644,549 | Cagle | July 7, 1953 |
| 2,746,254 | Lucien | May 22, 1956 |
| 2,778,451 | Friedman | Jan. 22, 1957 |

FOREIGN PATENTS

| | | |
|---|---|---|
| 760,877 | England | Nov. 7, 1956 |